United States Patent
Lo (10) Patent No.: US 9,769,079 B1
(45) Date of Patent: Sep. 19, 2017

(54) SIDEBAND COMMUNICATIONS OVER 40GBASE-R AND 100GBASE-R SYSTEMS

(71) Applicant: Marvell International Ltd., Hamilton (BM)

(72) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 196 days.

(21) Appl. No.: 14/533,246

(22) Filed: Nov. 5, 2014

Related U.S. Application Data (60) Provisional application No. 61/903,608, filed on Nov. 13, 2013.

(51) Int. Cl.
*H04L 12/825* (2013.01)
*H04L 12/28* (2006.01)
*H04L 12/801* (2013.01)

(52) U.S. Cl.
CPC ............. *H04L 47/25* (2013.01); *H04L 12/28* (2013.01); *H04L 47/35* (2013.01)

(58) Field of Classification Search
CPC ......... H04L 12/28; H04L 47/17; H04L 47/18; H04L 47/2458; H04L 47/25; H04L 47/263; H04L 47/35; H04L 2012/5674
See application file for complete search history.

(56) References Cited

U.S. PATENT DOCUMENTS

| | | | |
|---|---|---|---|
| 2014/0189459 A1* | 7/2014 | Vijayaraghavan .. | H03M 13/353 714/755 |
| 2015/0089319 A1* | 3/2015 | Ghiasi ................... | H04L 1/0063 714/758 |

OTHER PUBLICATIONS

LAN/MAN Standards Committee of the IEEE Computer Society. "802.3™ IEEE Standard for Information Technology—Telecommunications and Information Exchange between Systems—Local and Metropolitan Area Networks—Specific Requirements Part 3: Carrier Sense Multiple Access with Collision Detection (CSMA/CD) Access Method and Physical Layer Specifications." IEEE Standards (Mar. 8, 2002): IEEE Std 802.3™-2002: 1538 pages.

* cited by examiner

*Primary Examiner* — Khoa Huynh (57) ABSTRACT

A first network device including a physical layer device. The physical layer device is configured to receive data for transmission to a second network device and receive sideband data for transmission to the second network device. The sideband data corresponds to control information, management information, and/or status information. The physical layer device is further configured to provide, via a first wired connection, the data for transmission to the second network device, generate alignment markers, insert the sideband data into the alignment markers, and selectively provide, via the same first wired connection, the alignment markers including the sideband data inserted by the physical layer device.

16 Claims, 5 Drawing Sheets

| FEC LANE | Alignment Markers | | | | |
|---|---|---|---|---|---|
| 0 | 0 | 4 | 8 | 12 | 16 |
| 1 | ~~1~~ 0 | 5 | 9 | 13 | ~~17~~ 16 |
| 2 | ~~2~~ 0 | 6 | 10 | 14 | ~~18~~ 16 |
| 3 | ~~3~~ 0 | 7 | 11 | 15 | ~~19~~ 16 |

| FEC LANE | Alignment Markers | | | | |
|---|---|---|---|---|---|
| 0 | 0 | 4 | 8 | 12 | 16 |
| 1 | 1 | 5 | 9 | 13 | 17 |
| 2 | 2 | 6 | 10 | 14 | 18 |
| 3 | 3 | 7 | 11 | 15 | 19 |

FIG. 7

| FEC LANE | Alignment Markers | | | | |
|---|---|---|---|---|---|
| 0 | 0 | 4 | 8 | 12 | 16 |
| 1 | ~~10~~ | 5 | 9 | 13 | ~~17~~ 16 |
| 2 | ~~20~~ | 6 | 10 | 14 | ~~18~~ 16 |
| 3 | ~~30~~ | 7 | 11 | 15 | ~~19~~ 16 |

SIDEBAND COMMUNICATIONS OVER 40GBASE-R AND 100GBASE-R SYSTEMS

CROSS-REFERENCE TO RELATED APPLICATIONS

This application claims the benefit of U.S. Provisional Application No. 61/903,608, filed on Nov. 13, 2013. The entire disclosure of the application referenced above is incorporated herein by reference.

FIELD

The present disclosure relates to sideband communication between wired communication devices in a local or wide area Ethernet network.

BACKGROUND

In a wired local area network (LAN) or wide area network (WAN), two or more devices communicate over a wired physical medium (e.g., a wired connection such as copper, fiber, etc.). For example, the devices may include devices in an Ethernet LAN or WAN operating according to IEEE 802.3 protocol.

Figure 1:
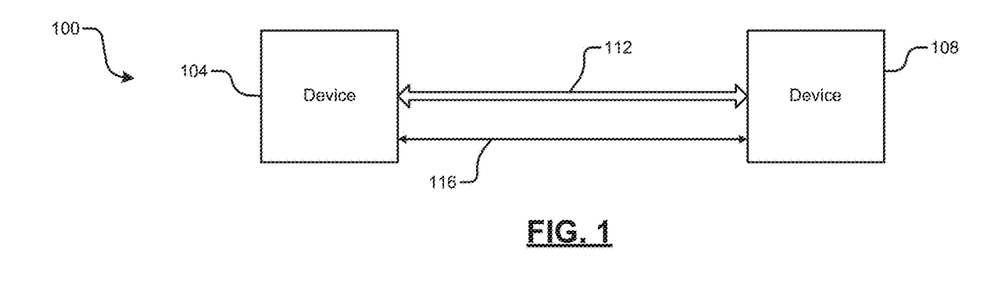
FIG. 1 is an example wired network.

FIG. 1 shows an example network 100 including devices 104 and 108. The devices 104 and 108 communicate (i.e., transmit and receive data) via a wired connection 112. For example only, the devices 104 and 108 may implement a physical coding sublayer (PCS) configured to operate according to 40GBASE-R and/or 100GBASE-R technologies. Accordingly, the wired connection 112 is capable of communicating data at 40 Gb and/or 100 Gb rates.

The network 100 may include a sideband connection 116. The sideband connection 116 corresponds to a wired connection separate from the wired connection 112. The devices 104 and 108 use the sideband connection 116 to communicate sideband data (e.g., management data, control data, etc.). A bandwidth of the sideband connection 116 may be significantly less than a bandwidth of the wired connection 112.

SUMMARY

A first network device includes a physical layer device. The physical layer device is configured to receive data for transmission to a second network device and receive sideband data for transmission to the second network device. The sideband data corresponds to control information, management information, and/or status information. The physical layer device is further configured to provide, via a first wired connection, the data for transmission to the second network device, generate alignment markers, insert the sideband data into the alignment markers, and selectively provide, via the same first wired connection, the alignment markers including the sideband data inserted by the physical layer device.

A method of operating a first network device includes receiving data for transmission to a second network device and receiving sideband data for transmission to the second network device. The sideband data corresponds to control information, management information, and/or status information. The method further includes providing, via a first wired connection, the data for transmission to the second network device, generating alignment markers, inserting the sideband data into the alignment markers, and selectively providing, via the same first wired connection, the alignment markers including the sideband data inserted by the physical layer device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

A physical layer (PHY) device of a first device configured to communicate in a 40GBASE-R or 100GBASE-R wired network transfers blocks of data to be transmitted from the first device to the physical transmission medium (e.g., a wired connection between the device and another device). For example, a physical coding sublayer (PCS) of the PHY device receives the data from a bus (e.g., an XLGMII or CGMII bus), performs 64/66 encoding on the data to encode the data into 66 bit blocks of data, and distributes the blocks of data into virtual lanes. The PCS inserts alignment markers between predetermined portions of the blocks of data (e.g., a 66 bit alignment marker after every 16383 of the blocks of data) and transfers the blocks of data in the virtual lanes, with the interspersed alignment markers, to a physical medium attachment (PMA) layer of the PHY device. The PMA layer passes the blocks of data to various physical medium dependent (PMD) sublayers of the PHY device for transmission from the first device to the physical transmission medium.

Accordingly, a stream of the data blocks transmitted from the first device includes the alignment markers, and a second device that receives the data blocks also receives the alignment markers. The second device uses the alignment markers to realign the received blocks of data. For example, the alignment markers include an indication of which virtual lane each of the blocks of data is associated with.

Sideband communication systems and methods according to the principles of the present disclosure insert sideband data (e.g., management data, control data, etc.) into the alignment markers. For example, each alignment marker is 66 bits, but only a portion of the 66 bits are used to indicate a virtual lane. The remaining bits of selected alignment markers can be encoded with sideband data. Accordingly, a separate sideband wired connection between the first device and the second device can be eliminated. Although the systems and methods are described in the context of 40GBASE-R and 100GBASE-R systems, the principles of the present disclosure are also applicable to 100GBASE-P, Multi-Link Gearbox (MLG), and other suitable protocols.

Figure 2:
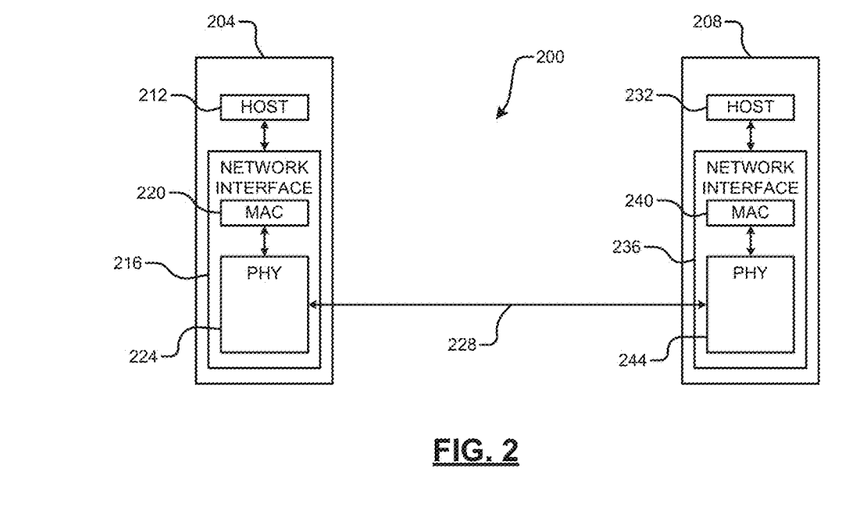
FIG. 2 is a functional block diagram of an example wired network.

FIG. 2 shows an example network 200 such as an Ethernet local area network (LAN) or wide area network (WAN). The network 200 includes a plurality of network devices including a first device 204 and a second device 208. The first device 204 and the second device 208 are each configured to implement the sideband communication systems and methods according to an embodiment of the present disclosure. The first device 204 includes a host processor 212 in communication with a network interface 216. The network interface 216 includes a medium access control (MAC) device 220 and a physical layer (PHY) device 224. The PHY device 224 transmits data to and receives data from the second device 208 via a wired connection 228.

The second device 208 includes a host processor 232 in communication with a network interface 236. The network interface 236 includes a MAC device 240 and a PHY device 244. The PHY device 244 transmits data to and receives data from the first device 204 via a wired connection 228.

The first device 204 and the second device 208 are each configured to insert sideband data into alignment markers transmitted with the blocks of data between the first device 204 and the second device 208. For example, for blocks of data transmitted from the first device 204 to the second device 208, the PHY device 224 inserts the sideband data into the alignment markers and inserts the alignment markers into the blocks of data. For example, only, the PHY device 224 may receive the sideband data from the MAC device 220. Conversely, the PHY device 244 retrieves the sideband data from the alignment markers received from the first device 204 and provides the sideband data to the MAC device 240.

Figure 3:
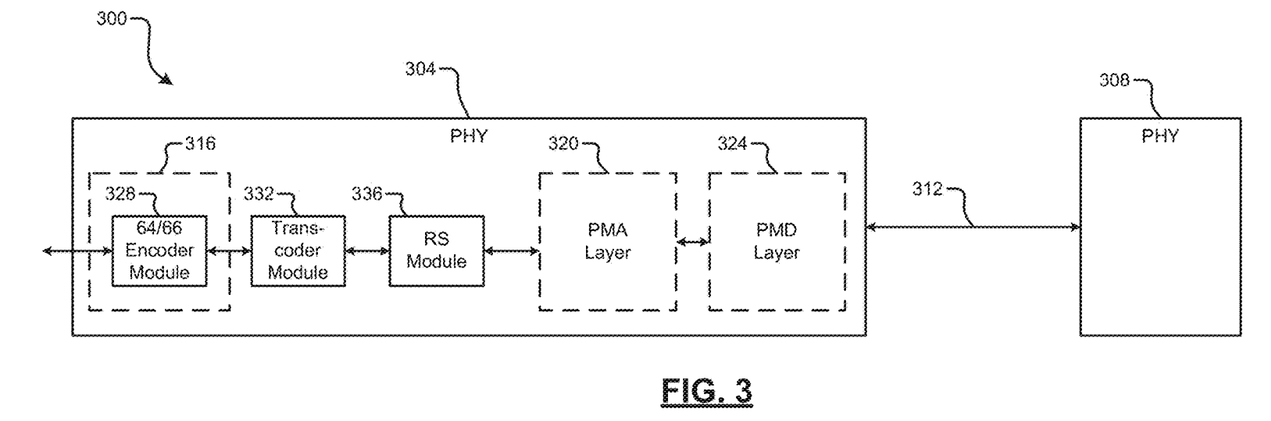
FIG. 3 is a functional block diagram of an example physical layer device.

FIG. 3 shows a simplified network 300 including a first PHY device 304 and a second PHY device 308 of respective devices configured to communicate over a wired connection 312. While only the first PHY device 304 is shown in detail, the second PHY device 308 may include analogous structure.

The first PHY device 304 includes a PCS 316, a PMA layer 320, and a PMD layer 324. The PCS 316 receives data (e.g., from a MAC device). The PCS 316 includes a 64/66 encoder module 328 that performs 64/66 encoding on the data to convert 64 bit (8 byte) blocks of the data into 66 bit blocks of data. The PCS 316 inserts alignment markers, which include sideband data, between predetermined portions of the blocks of data (e.g., a 66 bit alignment marker after every 16383 of the blocks of data) and distributes the blocks of data into virtual lanes. A transcoder module 332 maps 66 bit blocks of data received from the PCS 316 into 256/257 block of data. An optional Reed Solomon (RS) module 336 performs forward error correction (FEC) on the data and provides the data to the PMA layer 320. The PMA layer 320 provides the data to the PMD layer 324 for transmission to the second PHY device 308 over the wired connection 312.

Figure 4:
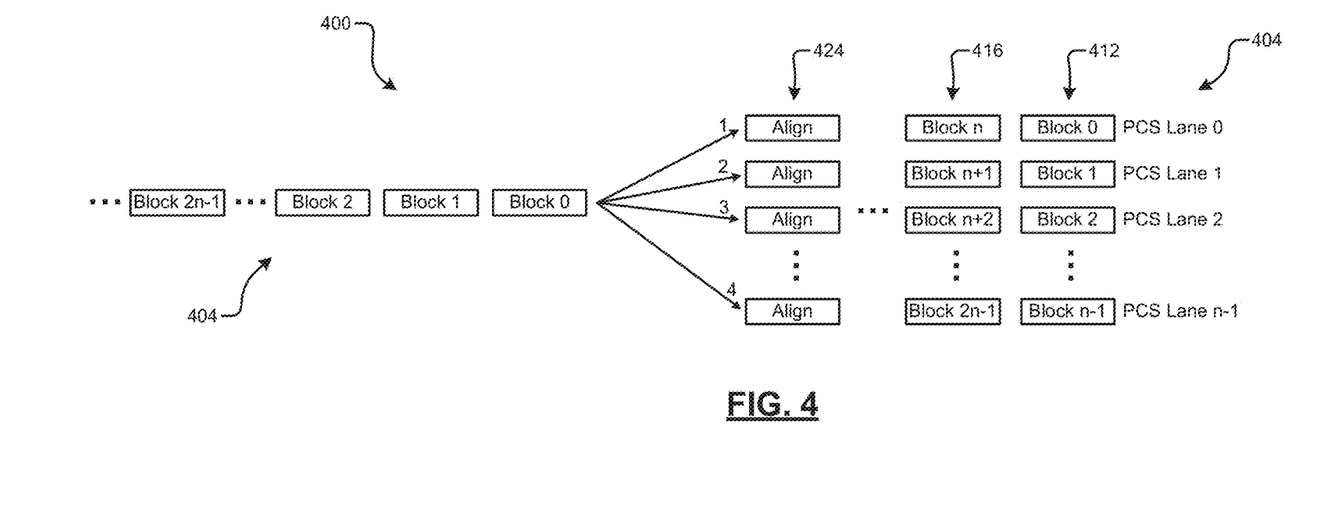
FIG. 4 illustrates an example virtual lane distribution scheme.

FIG. 4 shows an example distribution scheme 400 implemented by a PCS (e.g., the PCS 316) to distribute the 66 bit blocks of data 404 into n virtual PCS lanes 408 (e.g., PCS lanes 0, 1, 2, . . . , and n−1). For example, for a 40GBASE-R PHY, n=4, while for a 100GBASE-R PHY, n=20.

The PCS distributes the blocks of data 404 (e.g., blocks 0, 1, 2, . . . , n−1, n, n+1, n+2, . . . , and 2n−1) in a round robin manner. For example, the PCS sequentially provides block 0 to PCS lane 0, block 1 to PCS lane 1, block 2 to PCS lane 2, . . . , and block n−1 to PCS lane n−1 in a first round 412.

The PCS sequentially provides block n to PCS lane 0, block n+1 to PCS lane 1, block n+2 to PCS lane 2, . . . , and block 2n−1 to PCS lane n−1 in a second round 416 subsequent to the first round 412. The PCS periodically inserts alignment markers 420 into each of the lanes 408. For example, the PCS inserts the alignment markers 420 into each of the lanes 408 in a same (e.g., mth) round 424.

Figure 5:
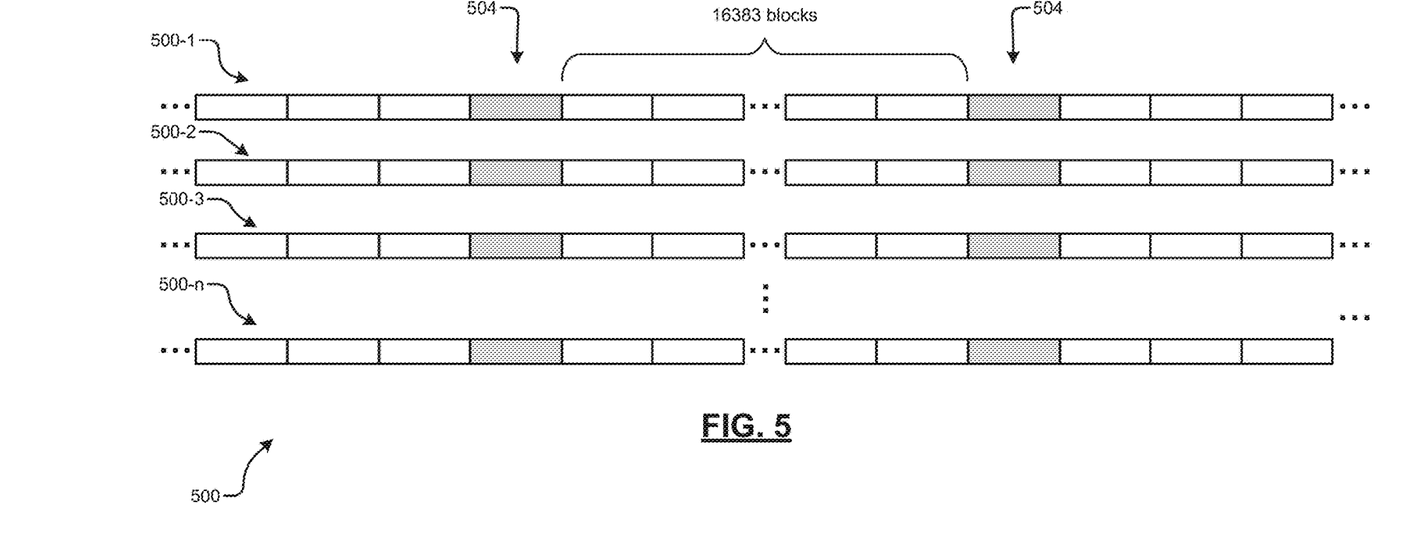
FIG. 5 illustrates example virtual lanes.
Figure 6:
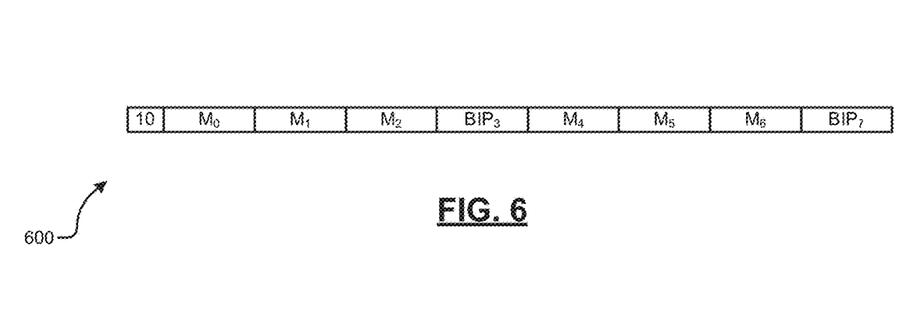
FIG. 6 illustrates an example alignment marker.

FIG. 5 shows example virtual lanes 500 (including lanes 500-1, 500-2, 500-3, . . . , and 500-$n$) of the blocks of data output by the PCS. Each lane includes alignment markers 504 separated by a plurality (e.g., 16383) of blocks of data. FIG. 6 shows an example alignment marker 600 including a header (e.g., a 2 bit header with the value 1 0 to identify the beginning of an alignment marker) followed by 8 bytes of data $M_0$, $M_1$, $M_2$, $BIP_3$, $M_4$, $M_5$, $M_6$, and $BIP_7$. Respective alignment markers 504 for each of the lanes 500 may be assigned different (e.g., unique) values for fields $M_0$, $M_1$, and $M_2$. $BIP_3$ is used for parity checking. $M_4$, $M_5$, $M_6$, and $BIP_7$ include inverted values of $M_0$, $M_1$, and $M_2$, and $BIP_3$, respectively to ensure an equal number of 1s and 0s in the alignment marker (since the alignment markers 504 are not scrambled) and maintain DC balance on the communication line. A receiving PHY device (e.g., the second PHY device 308) identifies a block of data corresponding to an alignment marker upon detecting a block of data including the 1 0 header and having a second 32 bits of data being an inverse of the first 32 bits of data. In the alignment marker 600 according to the principles of the present disclosure, one or more of the fields may be used to store sideband data as described below in more detail.

Data transferred over the communication medium (e.g., the wired connection 312) in the virtual lanes 500 may arrive at the second PHY device 308 at different times. Accordingly, the second PHY device 308 realigns the received data blocks in the different lanes 500 using the alignment markers 504. For example, the different values for $M_0$, $M_1$, and $M_2$ given to each lane indicate which of the virtual lanes 500 each of the alignment markers 504 is associated with. Accordingly, the second (i.e., receiving) PHY device 308 re-aligns the data according to the unique values in the respective alignment markers 504, removes the alignment markers 504, and descrambles and decodes the remaining data blocks. In embodiments of the present disclosure, the second PHY device 308 also removes sideband data from the alignment markers 504.

In embodiments that include the RS module 336 (e.g., 100GBASE-R systems with 20 virtual lanes), the RS module 336 receives the blocks of data in the virtual lanes from the PCS 316, and generates an RS-FEC block including the blocks of data and the alignment markers. Further, the RS module 336 modifies the alignment marker values according to IEEE 802.3 protocol and outputs the alignment markers of 20 virtual lanes onto 4 FEC lanes 0, 1, 2, and 3.

Figure 7:
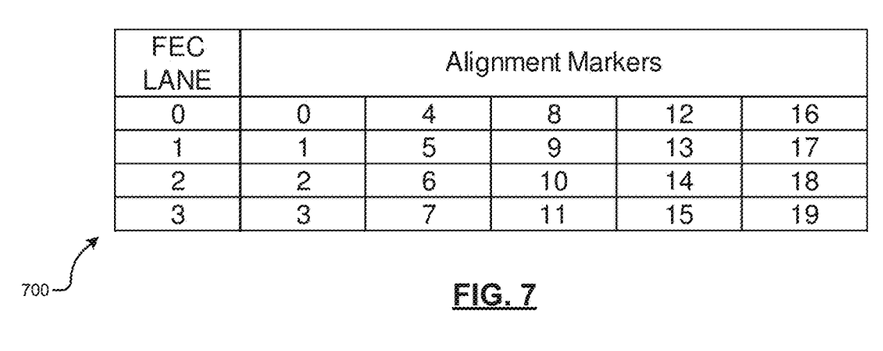
FIG. 7 illustrates an example Reed Solomon forward error correction block.

For example, FIG. 7 shows an example RS-FEC block 700 including alignment markers 0-19. For example only, only the portion of the RS-FEC block 700 including the alignment markers 0-19 is shown, not the entire RS-FEC block. 5 of the alignment markers are distributed onto each FEC lane 0-3. For example only, alignment markers 0, 4, 8, 12, and 16 (i.e., every fifth alignment marker) are distributed on FEC lane 0, alignment makers 1, 5, 9, 13, and 17 are distributed on FEC lane 1, etc. Accordingly, alignment markers 0-3 are transmitted in parallel on FEC lanes 0-3, respectively, alignment markers 4-7 are transmitted in parallel on FEC lanes 4-7, respectively, etc.

Figure 8:
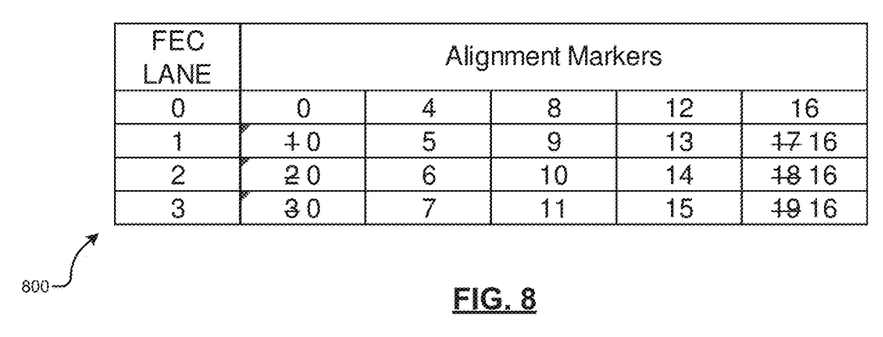
FIG. 8 illustrates an example modified Reed Solomon forward error correction block.

However, the RS module 336 replaces the alignment makers 1-3 (i.e., the alignment markers for virtual lanes 1-3)

with the alignment marker 0, and replaces the alignment markers 17-19 (i.e., the alignment markers for virtual lanes 16-19) with the alignment marker for lane 16 as shown in FIG. 8. In other words, the first 4 alignment markers of the RS-FEC block 800 output in parallel on FEC lanes 0-3 by the RS module 336 have the same value (i.e., the value of the alignment marker 0), and the last 4 alignment markers of the RS-FEC block 800 output in parallel on FEC lanes 0-3 by the RS module 336 have the same value (i.e., the value of the alignment marker 16). Again, for example only, only the portion of the RS-FEC block 800 including the alignment markers 0-19 is shown, not the entire RS-FEC block.

The alignment markers 4-15 corresponding to FEC lanes 4-15 are not modified by the RS module 336. Accordingly, in embodiments according to the principles of the present disclosure, the PCS 316 inserts the sideband data into portions of the alignment markers 4-15. For example, several of the bits of each of the alignment markers (e.g., 5 bits of each alignment marker) may be reserved to uniquely identify which of the 20 virtual lanes the alignment marker is associated with. In this manner, the second PHY device 308 can still identify the respective virtual lane of each of the alignment markers 0-19.

The remaining bits of each alignment marker can be used to store sideband data. However, as described above, in some embodiments the first 32 bits of each alignment marker are repeated in the second 32 bits for DC balancing. Accordingly, systems and methods according to the present disclosure may only use 27 bits (e.g., 32 minus the 5 bits used for lane identification) of each alignment marker to store the sideband data. In some embodiments where DC balancing is not a concern, the second 32 bits of each alignment marker may still be used to store the sideband data, or the sideband data may be randomized or otherwise modified to prevent DC balancing issues. In embodiments with parity checking (e.g., the 8 bits of $BIP_3$), the number of bits available for sideband data is reduced to 19 bits.

In embodiments without the RS module 336 (i.e., in embodiments that do not perform FEC on the alignment markers and therefore do not modify the alignment markers in virtual lanes 1-3 and 17-19), the alignment markers of all 20 of the virtual lanes can be used to store the sideband data. Alternatively, the RS module 336 according to an embodiment of present disclosure may be configured to not modify any of the alignment markers of the 20 virtual lanes in the RS-FEC block 800. Accordingly, even when the RS module 336 is included and performs FEC, the alignment markers of all 20 of the virtual lanes can still be used to store the sideband data.

In other embodiments, the 5 bits of each of the alignment markers may not be reserved for lane identification. For example, once the second PHY device 308 locks onto (i.e., is aligned temporally with) the stream of data received from the first PHY device 304, the 5 bits used for lane identification are not necessary. Alternatively, the 5 bits may be reserved for lane identification once every N×16384 66-bit blocks, and be used to store additional sideband data in the remaining N−1 instances of the alignment markers.

Accordingly, example maximum sideband data rates are (100 Gb/s×20 lanes×19 bits)/(20 lanes×16384×64 bits) =1.81 Mb/s for 100GBASE-R systems without RS-FEC, (100 Gb/s×14 lanes×19 bits)/(20 lanes×16384×64 bits) =1.27 Mb/s for 100GBASE-R systems with RS-FEC, and (40 Gb/s×4 lanes×19 bits)/(4 lanes×16384×64 bits)=0.72 Mb/s for 40GBASE-R systems.

Figure 9:
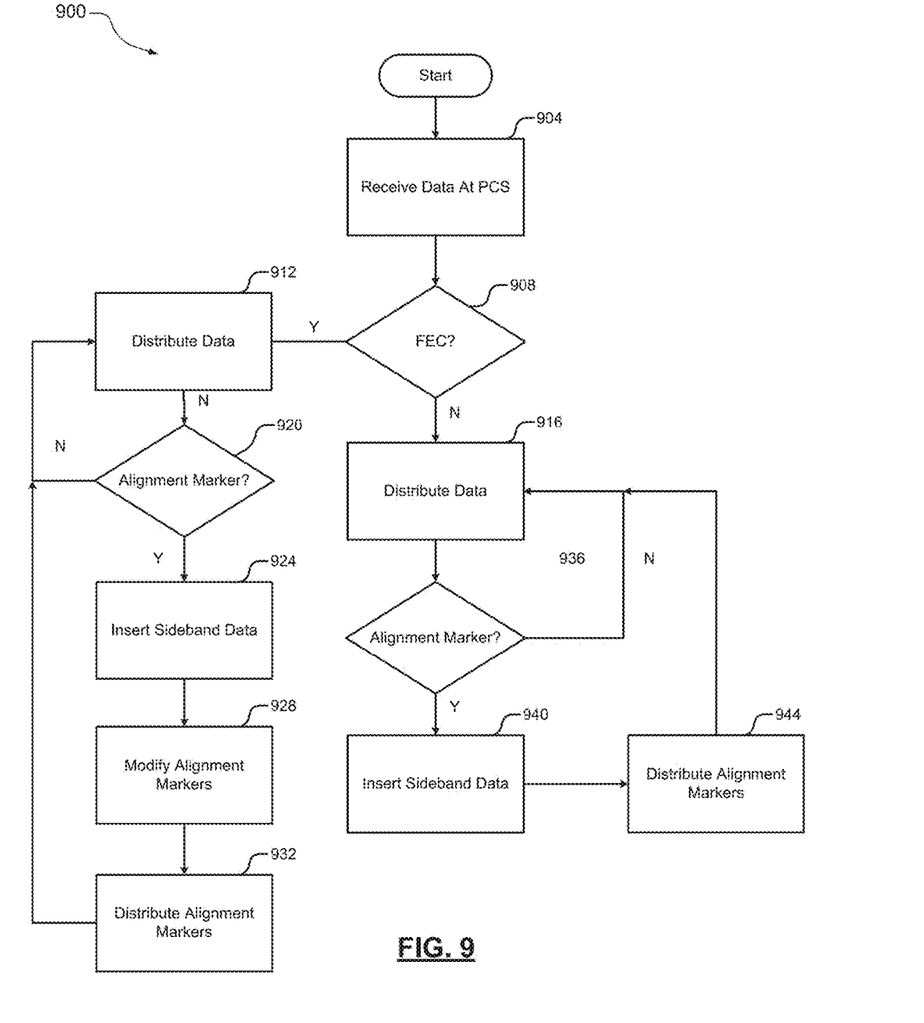
FIG. 9 illustrates an example method for communicating sideband data.

FIG. 9 is an example method 900 for communicating sideband data. For example only, the method 900 corresponds to a 100GBASE-R system implementing 20 virtual lanes. At 904, data, including sideband data, is received at the PHY device for transmission. For example, a PCS of the PHY device receives the data from a MAC device over an internal bus. At 908, the PCS determines whether the PHY device implements FEC. For example, the PCS may be preconfigured to insert sideband data into alignment markers based on whether the PHY device includes an RS module. If true, the method 900 continues to 912. If false, the method 900 continues to 916.

At 912, the PCS distributes the data into virtual lanes. For example, the PCS distributes the data in a round robin fashion as described above in FIG. 4. At 920, the PCS determines whether to insert an alignment marker. If true, the method 900 continues to 924. If false, the method 900 continues to 912. At 924, the PCS inserts the sideband data into portions of the respective alignment markers for the 20 virtual lanes as described above in FIGS. 7 and 8. At 928, the RS module modifies portions of the alignment markers. At 932, the RS module distributes the modified alignment markers including the sideband data (e.g., arranged in an RS-FEC block) into 4 FEC lanes.

At 916, the PCS distributes the data into virtual lanes. At 936, the PCS determines whether to insert an alignment marker. If true, the method 900 continues to 940. If false, the method 900 continues to 916. At 940, the PCS inserts the sideband data into portions of the respective alignment markers for the 20 virtual lanes as described above in FIGS. 7 and 8. At 944, the PCS provides the alignment markers to a PMA layer of the PHY device for transmission.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the terms 'module,' 'controller,' or 'device' may be replaced with the term 'circuit.' The terms 'module,' 'controller,' or 'device' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module, controller, or device may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A first network device, comprising:
 a physical layer device including one or more circuits configured to
 receive data for transmission to a second network device,
 receive sideband data for transmission to the second network device, wherein
 the sideband data corresponds to at least one of control information, management information, and status information, and
 provide, via a first wired connection, the data for transmission to the second network device; and
 a physical coding sublayer including one or more circuits configured to
 generate alignment markers, and
 insert the sideband data into the alignment markers,
 wherein the physical layer device is further configured to selectively provide, via the same first wired connection, the alignment markers including the sideband data inserted by the physical layer device,
 wherein the physical coding sublayer is configured to distribute the alignment markers into a plurality of virtual lanes, and
 wherein, to insert the sideband data into the alignment markers, the physical coding sublayer is configured to insert the sideband data into the alignment markers corresponding only to selected ones of the plurality of virtual lanes and not to other ones of the plurality of virtual lanes.

2. The first network device of claim 1, further comprising:
 a media access control device configured to provide (i) the data for transmission to the second network device and (ii) the sideband data.

3. The first network device of claim 1, wherein the first wired connection corresponds to a 100GBASE-R or 40GBASE-R connection.

4. The first network device of claim 1, wherein, to receive the data and the sideband data, the physical layer device is configured to receive the data and the sideband data from a media access control device.

5. The first network device of claim 4, wherein the physical layer device further comprises:
 a forward error correction module configured to (i) arrange the alignment markers, received from the physical coding sublayer via the plurality of virtual lanes, into a block of alignment markers and (ii) distribute, for transmission on the first wired connection, the block of alignment markers into a number of lanes that is less than the plurality of virtual lanes.

6. The first network device of claim 5, wherein, to insert the sideband data into the alignment markers corresponding only to the selected ones of the plurality of virtual lanes and not to the other ones of the plurality of virtual lanes, the physical coding sublayer is configured to not insert the sideband data into the alignment markers corresponding to (i) first virtual lanes of the plurality of virtual lanes and (ii) last virtual lanes of the plurality of virtual lanes.

7. The first network device of claim 6, wherein the forward error correction module is configured to modify the alignment markers corresponding to (i) the first virtual lanes of the plurality of virtual lanes and (ii) the last virtual lanes of the plurality of virtual lanes.

8. A network, comprising:
the first network device of claim 1; and
the second network device, wherein the second network device is configured to retrieve the sideband data from the alignment markers received from the first network device over the first wired connection.

9. A method of operating a first network device, the method comprising:
using a physical layer device,
receiving data for transmission to a second network device;
receiving sideband data for transmission to the second network device, wherein the sideband data corresponds to at least one of control information, management information, and status information;
providing, via a first wired connection, the data for transmission to the second network device;
generating alignment markers;
inserting the sideband data into the alignment markers;
distributing the alignment markers into a plurality of virtual lanes; and
selectively providing, via the same first wired connection, the alignment markers including the sideband data inserted by the physical layer device,
wherein inserting the sideband data into the alignment markers includes inserting the sideband data into the alignment markers corresponding only to selected ones of the plurality of virtual lanes and not to other ones of the plurality of virtual lanes.

10. The method of claim 9, wherein providing the data and the sideband data includes providing the data and the sideband data using a media access control device.

11. The method of claim 9, wherein the first wired connection corresponds to a 100GBASER or 40GBASE-R connection.

12. The method of claim 9, wherein receiving the data and the sideband data includes using a physical coding sublayer to (i) receive the data and the sideband data from a media access control device and (ii) insert the sideband data into the alignment markers.

13. The method of claim 12, further comprising:
arranging the alignment markers, as received from the physical coding sublayer via the plurality of virtual lanes, into a block of alignment markers; and
distributing, for transmission on the first wired connection, the block of alignment markers into a number of lanes that is less than the plurality of virtual lanes.

14. The method of claim 13, wherein inserting the sideband data into the alignment markers corresponding only to the selected ones of the plurality of virtual lanes and not to the other ones of the plurality of virtual lanes includes not inserting the sideband data into the alignment markers corresponding to (i) first virtual lanes of the plurality of virtual lanes and (ii) last virtual lanes of the plurality of virtual lanes.

15. The method of claim 14, further comprising modifying the alignment markers corresponding to (i) the first virtual lanes of the plurality of virtual lanes and (ii) the last virtual lanes of the plurality of virtual lanes.

16. The method of claim 9, further comprising:
Using the second network device, retrieving the sideband data from the alignment markers received from the first network device over the first wired connection.

* * * * *